United States Patent [19]

Beichel

[11] 4,220,001
[45] Sep. 2, 1980

[54] DUAL EXPANDER ROCKET ENGINE

[75] Inventor: Rudi Beichel, Sacramento, Calif.

[73] Assignee: Aerojet-General Corporation, LaJolla, Calif.

[21] Appl. No.: 825,411

[22] Filed: Aug. 17, 1977

[51] Int. Cl.² .......... F02K 9/06; F02K 9/02; B64C 15/04
[52] U.S. Cl. ............ 60/225; 60/259; 60/260; 60/263; 60/271; 239/265.27
[58] Field of Search ........ 60/225, 257, 259, 260, 60/263, 271, 250, 39.27, 224; 239/265.25, 265.27; 244/172

[56] References Cited

U.S. PATENT DOCUMENTS

| | | | |
|---|---|---|---|
| 2,408,111 | 9/1946 | Truax et al. | 60/39.48 |
| 2,816,417 | 12/1957 | Bloomberg | 60/39.27 |
| 2,981,059 | 4/1961 | Horner et al. | 60/263 |
| 3,034,293 | 5/1962 | Ferris et al. | 60/257 |
| 3,261,571 | 7/1966 | Pinnes | 244/172 |
| 3,523,422 | 11/1970 | Wolf | 60/224 |
| 3,541,795 | 11/1970 | Nelson | 60/271 |
| 3,613,375 | 10/1971 | Abild | 60/260 |
| 3,636,712 | 1/1972 | Kaufmann | 60/260 |
| 3,871,173 | 3/1975 | McKenna | 60/271 |
| 3,955,784 | 5/1976 | Salkeld | 60/245 |

OTHER PUBLICATIONS

Aviation Week & Space Technology, Sep. 19, 1966, pp. 60-61, 63, 65.

Primary Examiner—Douglas Hart
Attorney, Agent, or Firm—John S. Bell

[57] ABSTRACT

A composite cycle rocket engine having an inner engine disposed to discharge directly into the nozzle of an outer engine, is described herein.

4 Claims, 3 Drawing Figures

DUAL EXPANDER ROCKET ENGINE

BACKGROUND OF THE INVENTION

1. Field of the Invention

Rocket propulsion.

2. Brief Description of the Prior Art

Placement of one or more engines inside an outer engine to provide a compact, high performance, multiple performance level rocket engine has been considered previously. But, the effectiveness of prior designs is limited by the geometry and relative positions of the different component engines. In prior designs in which the components are positioned so that flow from the inner engine enters and expansion nozzle of the outer engine through the throat of that outer engine, the throat of the outer engines comprises a gate for flow from the inner engine as well as for flow from the combustion chamber of the outer engine when both engines operate simultaneously. The inner engine thus does not add to the thrust that would be provided by the outer engine operating alone. When the inner engine operates alone, a balancing pressure must be maintained in the combustion chamber of the outer engine to avoid shock waves and unstable pressure discontinuities. It is extremely difficult because of the relative positions of the different components to provide sufficient pressurization of the outer engine to balance anything other than very low pressure operation of the inner. When the outer engine operates alone, the inner engine has no effect on performance other than to take up space in the outer engine combustion chamber.

Prior designs having an inner engine disposed either partially or completely downstream from the throat section of an outer engine, do not continue the smooth, non-turbulent expansion of gases from the inner engine in the expansion nozzle of the outer. The outer engine thus does not increase the effective area ratio or performance of the inner. And, when the inner engine extends to a position near the outlet or end of the expansion nozzle of the outer engine, it reduces the cross-sectional area, area ratio and performance of the outer engine.

SUMMARY OF THE INVENTION

This invention comprises a composite engine having at least one engine placed at least partially within another to discharge directly into the expansion nozzle of the outer engine so that the throat sections of the different engines function in parallel and the expansion nozzle of the outer engine functions as a common nozzle for both engines. Multiple engines positioned in this manner each provide full thrust and performance when all engines function simultaneously, as well as when any one engine functions alone. The different engines can utilize either the same or different propellants in different embodiments. But significant size and performance benefits are provided by, use of a high density propellant or propellant combination to overcome gravity in launch, and a low density propellant or propellant combination in space. And, it is also desirable to have a smaller area ratio, or difference between the throat and maximum engine nozzle cross sectional areas, for operation in atmosphere than for operation in space. Accordingly, this invention encompasses the optional incorporation into embodiments when desired, of apparatus for moving nozzles with respect to each other to vary the effective throat area of an outer engine by changing the portion of an inner engine nozzle disposed in that throat. In addition, a feed system particularly suitable for delivering different propellants to different engine combustion chambers that includes a separate turbopump for each propellant, one preburner for driving the oxidizer turbopumps, and a second preburner for driving the fuel turbopumps, is also illustrated herein. These separate components facilitate variable operation, and minimize the need for complex turbopump and other seals to separate combustibly interactive propellants. The weight of this feed system is minimized by use of preburners designed to drive the turbopumps by burning small stoichiometric ratio quantities of fuel and oxidizer and then subsequently adding propellant to the gases generated by that combustion.

BRIEF DESCRIPTION OF THE DRAWINGS

The objectives, features, and advantages of this invention will become further apparent from the following description and accompanying drawings in which.

DETAILED DESCRIPTION OF THE DRAWINGS

Figure 1:
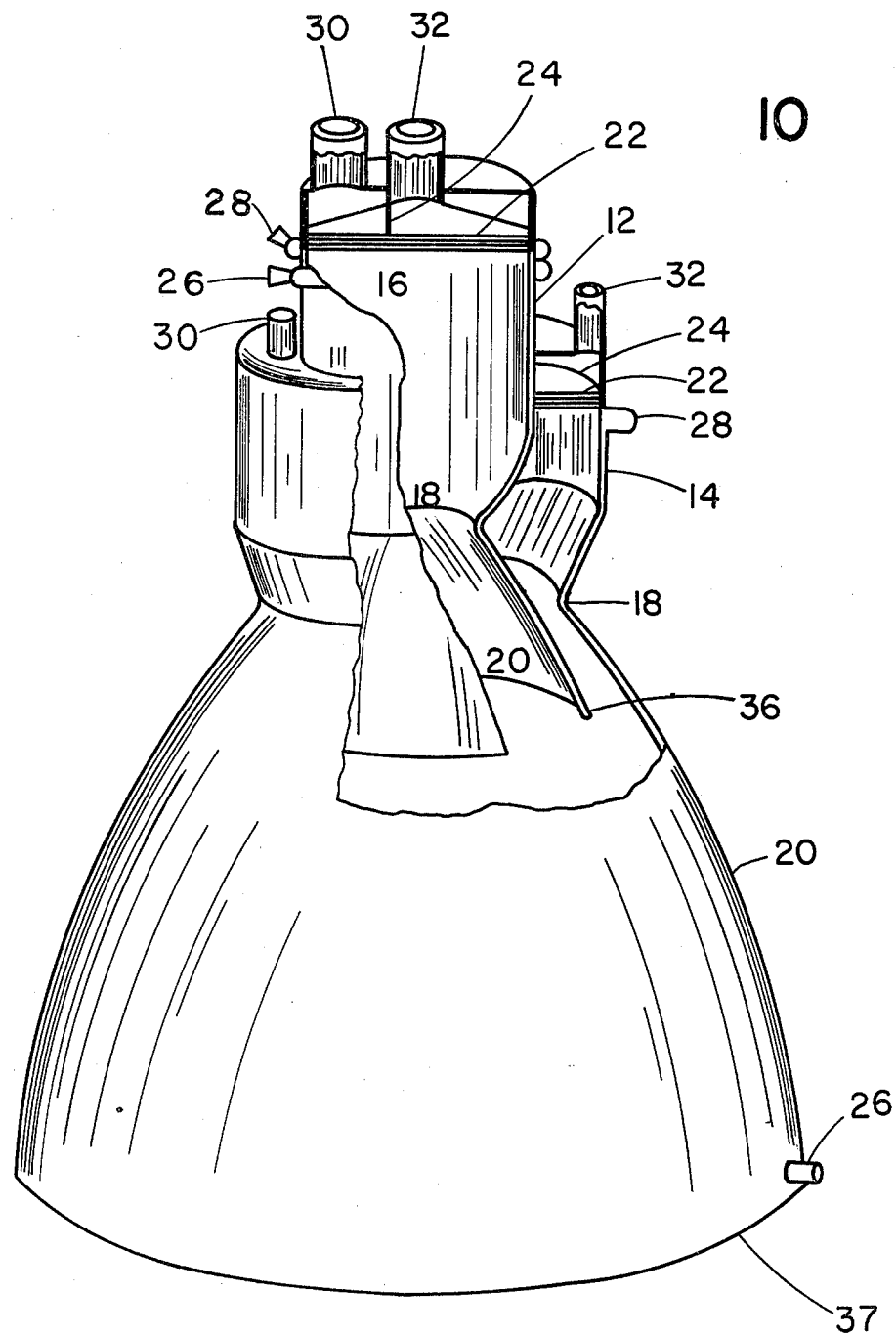
FIG. 1 is a partially cutaway, isometric, graphic illustration of a dual nozzle engine.

FIG. 1 illustrates a dual engine 10 formed from two concentric, conventional, double-walled bipropellant engines 12 and 14. Each engine 12 and 14 includes a combustion chamber 16, throat section 18, expansion nozzle 20, injector 22, propellant delivery manifold 24, pipeline fittings 26 and 28 for transmission of propellant or other fluid between the nozzle walls for cooling, and fittings 30 and 32 for supply of combustibly interactive propellants to the manifold 24. As is shown most clearly by FIG. 2, inner engine 12 terminates near the throat section 18 of outer engine 14 to minimize the overall weight of engine 10. This termination does not limit the performance that can be attained from inner engine 12 because expansion nozzle 20 of outer engine 14 serves as a common nozzle for both engines.

The expansion nozzle 20 of inner engine 12 is shaped to form a smaller angle to the central axis of engine 10 than the expansion nozzle of outer engine 14. The space between the two engines is thus smallest at the throat 18 of outer engine 14 and increases with displacement toward the end 36 of inner engine 12. This increase allows combustion gases to begin expanding immediately downstream from the throat 18 of outer engine 12. And, unless a special deflection is desired in a particular embodiment, the expansion nozzle of inner engine 12 should thus extend into the expansion nozzle of outer engine 14, and away from the walls of that outer engine, a distance such that the pressures of expanding gases from the two engine combustion chambers will be approximately equal proximate the end 36 of inner engine 12 when both engines operate together at their planned normal combustion chamber operating point.

Fabrication of any embodiment of the engine 10 should be performed in a straightforward manner utilizing conventional methods and components accepted as appropriate to accommodate the pressures and temperatures at which it is intended to operate that embodiment, with the exception that there may be some reduction to what would otherwise be required in construction of engine 12 in areas where the pressures inside that engine will be partially balanced during operation by the pressures of outer engine 14.

In operation of the composite engine 10 with both engines 12 and 14 operating simultaneously, the pressures should be balanced as described above. As is shown most clearly by FIG. 2, the expansion nozzles 20 of engines 12 and 14 are sufficiently close to each other and have sufficiently similar geometries so that when inner engine 12 operates alone or substantially alone, expansion nozzle 20 of outer engine 14 completes expansion of gases from inner engine 12 and provides it with an effective area ratio equal to the maximum cross-sectional area of the expansion nozzle 20 of outer engine 14 divided by the crosssectional area of throat 18 of inner engine 12. The portion of outer engine 14 upstream from the end 36 of inner engine 12 should be pressurized to avoid any pressure discontinuity between the two engines or turbulent recirculation of flow from engine 12 into engine 14. Generally only a very slight bleed of additional propellant into engine 14 will prevent turbulence. When outer engine 14 operates alone or substantially alone, operation is in the forced deflection mode, with the walls of engine 12 deflecting flow toward the central axis of the structure 10. Operation in this mode provides a particularly large area ratio, gas expansion and specific impulse. A pressure approximately equal to the pressure at the discharge 37 from engine 14 should be maintained in the inner engine 12 to prevent turbulent recirculation. But, operation of engine 14 does produce a static pressure in inner engine 12. And, only a small propellant bleed flow into inner engine 12, of less than 1% of the propellant flow into outer engine 14, is needed to provide the desired pressure balance.

Figure 2:
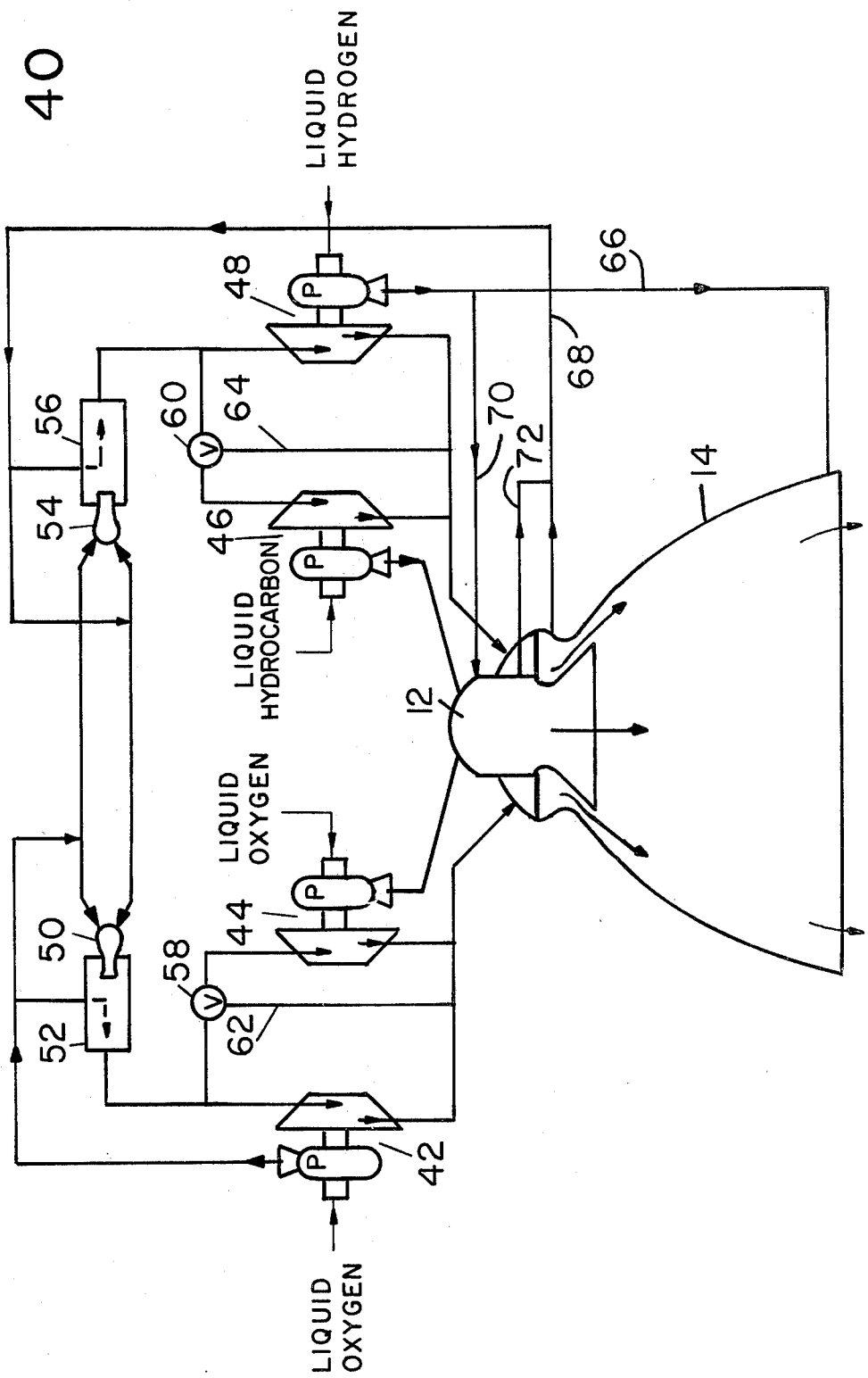
FIG. 2 is a schematic illustration of a complete engine system, including apparatus for supplying propellants to the components shown in FIG. 1, in which standard drafting symbols are used to represent the different engine components.

FIG. 2 illustrates a complete engine system 40 that includes turbopumps 42 and 44 for supplying oxidizer propellant to the engines 12 and 14 illustrated in FIG. 1, and turbopumps 46 and 48 for supplying fuel propellants to those engines. The engine 40 also includes a preburner combustor 50 and mixer 52 for driving the turbines of oxidizer turbopumps 42 and 44, a second preburner combustor 54 and mixer 56 for driving fuel turbopumps 46 and 48, valves 58 and 60 for control and shutoff of flow to inner engine 12, and by-pass lines 62 and 64 for preventing turbopumps 42 and 48 from being driven to excessive speeds when flow to engine 12 is shut down. The combustors 50 and 54 are conventional devices. They apply the drive energy for turbopumps 42, 44, 46, and 48. In the engine 40, they should be sized along with their propellant feed lines so that only small quantities of propellant in stoichiometric proportions are introduced into the preburner combustion chambers. These combust completely very quickly, and in a very small area. There are thus no streaks of one propellant in another in the output from the combustion chamber as there can be from other preburners. The mixers 52 and 56 comprise chambers having orifices for receiving two different fluids connected to introduce propellant into the gaseous flows from those combustors to provide desired mass flow and temperature. The combustion and mixing chambers of engine 40 together weigh less than a combustion chamber sized to accommodate both the mixing and subsequent combustion of a small quantity of one propellant into a larger quantity of another. And, since the instant preburners receive propellant in stoichiometric proportion, identical embodiments can be used in both fuel and oxidizer supply lines.

The engine 40 is designed for continuous operation of outer engine 14 during all operating modes. Accordingly, turbopump 48 is connected via lines 66, 68, 70, and 72 to provide cooling of both inner engine 12 and outer engine 14. But, other embodiments could be modified in a straighforward manner to include apparatus for throttling and shutoff of turbopumps 42 and 48, and use oxidizer to provide either additional or the entire cooling. In operation, it is generally desirable to maintain both high pressures and a pressure differential between the two combustion chambers, with the combustion chamber pressure of inner engine 12 as high as 6000 psi, a pressure in the combustion chamber of outer engine 14 as high as 3000 psi, a high density fuel such as liquid hydrocarbon supplied to inner engine 12, and a lower density fuel having a high specific impulse such as hydrogen driving outer engine 14. Variation, including use of other propellants, and either lower or higher pressures is possible. But, in one preferred operating mode it is desirable to utilize such pressures and inject both fuel and oxidizer propellants into engine 12 in the liquid state and engine 14 in the gaseous state. The propellants used to drive outer engine 14 are therefore used to provide the entire cooling of both engines and the entire drive energy of all supply turbopumps before being ducted into the combustion of engine 14 for final combustion. They absorb sufficient heat in performing those functions to enter engine 14 in the gaseous state. Also, depending on mission requirements, it is often desirable to adjust valves 58 and 60 and turbopumps 44 and 46 so that both engines operate simultaneously with inner engine 12 providing between about 25% to 75% of the thrust for the first phase of flight and is then shut down when the vehicle reaches a predetermined position as dictated by the flight trajectory.

Figure 3:
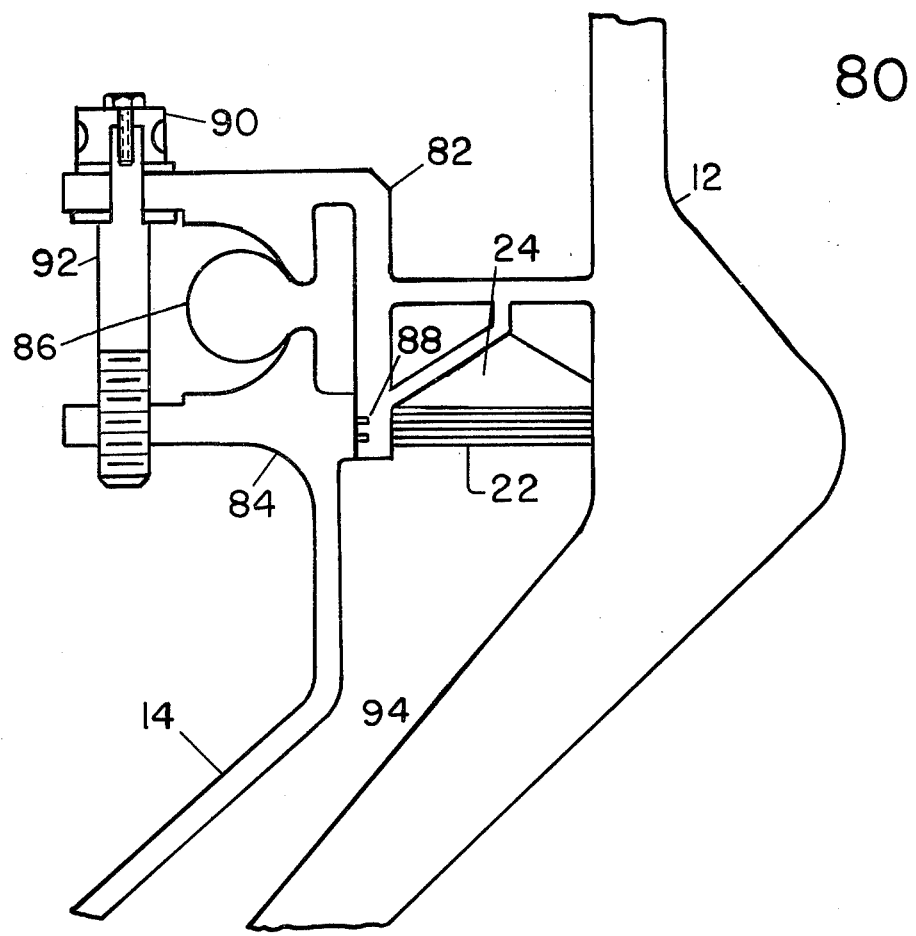
FIG. 3 is a cutaway, plan view of apparatus for providing relative throat displacement between two concentric expansion nozzles.

FIG. 3 illustrates a mechanism 80 for providing displacement between two concentric nozzles that includes a surface member 82 interconnected to inner engine 12, a projecting surface 84 of outer engine 14 in sliding contact with surface 82, a flexible seal 86 and ring seals 88 disposed to prevent leakage across sliding interface between surfaces 82 and 84, and drive gear 90 and screw 92. Screw 92 is fixed to surface 82 and threadably connected to surface 84 to provide axial displacement between engines 12 and 14. In operation, gear 90 will be driven by a motor (not shown) to cause screw 90 to move engines 12 and 14 closer together to decrease the gap 94 between those engines that comprises the throat of the outer engine for operation in space and further apart for operation in atmosphere.

Having thus provided this description, what is claimed is:

1. A composite rocket engine comprising:
   a first engine having a combustion chamber, throat section, and expansion nozzle; and
   a second engine, also having a combustion chamber, throat section, and expansion nozzle positioned such that at least a portion of said second engine is disposed within said first engine, wherein:
   said second engine traverses the throat section of said first engine so that the throat sections of the two engines function in parallel when said first and second engines operate together;

the expansion nozzle of said second engine terminates within the expansion nozzle of said first engine proximate the throat section of said first engine to minimize weight of the composite engine; and the expansion nozzle of said first engine is shaped to complete expansion of gases from said second engine and provide said second engine with an effective area ratio when operated alone equal to the maximum cross-sectional area of said expansion nozzle of said first engine divided by the cross-sectional area of said throat section of said second engine.

2. The composite engine of claim 1 in which said expansion nozzle of said second engine terminates within said expansion nozzle of said first engine at a position where static pressures of expanding gases from said first and second engines are approximately equal when both engines operate together at a normal planned combustion chamber pressures.

3. The composite engine of claim 1 which:

said expansion nozzle of said second engine comprises a bell-shaped nozzle; and the composite engine further includes means for providing displacement between said first and second engines to vary the effective area of said first engine throat section by changing the portion of said second engine expansion nozzle disposed within said first engine throat section of said first engine.

4. The composite of claim 1 in which said first and second engines are concentric.

* * * * *